United States Patent
Yasuda et al.

(10) Patent No.: US 7,633,661 B2
(45) Date of Patent: Dec. 15, 2009

(54) HOLOGRAM RECORDING APPARATUS AND HOLOGRAM RECORDING METHOD

(75) Inventors: Shin Yasuda, Ashigarakami-gun (JP); Jiro Minabe, Ashigarakami-gun (JP); Yasuhiro Ogasawara, Ashigarakami-gun (JP); Kazuhiro Hayashi, Ashigarakami-gun (JP); Hisae Yoshizawa, Ashigarakami-gun (JP); Koichi Haga, Ashigarakami-gun (JP); Katsunori Kawano, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 11/057,189

(22) Filed: Feb. 15, 2005

(65) Prior Publication Data

US 2006/0077851 A1    Apr. 13, 2006

(30) Foreign Application Priority Data

Sep. 10, 2004   (JP) .............................. 2004-264324

(51) Int. Cl.
*G03H 1/02*   (2006.01)
(52) U.S. Cl. .............................. 359/28; 359/10; 359/11
(58) Field of Classification Search ........................ None
See application file for complete search history.

(56) References Cited

U.S. PATENT DOCUMENTS

| | | | | |
|---|---|---|---|---|
| 6,281,994 B1 * | 8/2001 | Horikoshi et al. | ............. | 359/32 |
| 2004/0085600 A1 * | 5/2004 | Kim | ............................ | 359/35 |

FOREIGN PATENT DOCUMENTS

| | | |
|---|---|---|
| JP | 10-340479 | 12/1998 |
| JP | 2000-211257 | 8/2000 |
| JP | 2000-263910 | 9/2000 |

* cited by examiner

*Primary Examiner*—Arnel C Lavarias
(74) *Attorney, Agent, or Firm*—Oliff & Berridge, PLC (57) ABSTRACT

A hologram recording apparatus includes a light source for irradiating coherent light, light separator for separating the coherent light into light for reference beam and light for signal beam, optical path changer for changing an optical path of each light separated by the light separator so that the reference beam and the signal beam may be irradiated simultaneously onto an optical recording medium, a spatial light modulator disposed in the optical path of the light for the signal beam for modulating the light for the signal beam in accordance with a supplied recording signal to create signal beam for recording a hologram, and diffused light irradiator for irradiating diffused light simultaneously with the reference beam at least onto an area of the optical recording medium where the reference beam is irradiated.

12 Claims, 6 Drawing Sheets

ORIGINAL IMAGE

FIG.2B

RECONSTRUCTED IMAGE

HOLOGRAM RECORDING APPARATUS AND HOLOGRAM RECORDING METHOD

CROSS-REFERENCE TO RELATED APPLICATION

This application claims priority under 35 USC 119 from Japanese Patent Application No. 2004-264324, the disclosure of which is incorporated by reference herein.

BACKGROUND OF THE INVENTION

1. Field of the Invention

The present invention relates to a hologram-recording method, an optical recording medium, and a hologram-recording device, and in particular to a hologram-recording method for recording a volume hologram in an optical recording medium, and an optical recording medium and a hologram-recording device favorably used in the recording method.

2. Description of the Related Art

Forgery and alteration of ID and credit cards and the like have been emerging as a serious social problem recently. One of the reasons for that is the progress in copying technology, which enables duplication of the hologram seals adhered for prevention of forgery.

Conventional hologram seals, which are duplicated from a master hologram, generally employ a rainbow hologram generated by surface relief pattern. For example, a press die is prepared from a master relief hologram having a surface relief pattern; a great number of hologram seals having the same pattern are produced by heat-pressing process using the die; and such hologram seals are adhered to display media such as cards.

However, duplication of the surface-relief-based pattern can be performed relatively easily by using the current copying technology. As a result, the forgery preventing effect of hologram seals is diminishing day by day.

Recently, a method of on-demand hologram printing has been proposed [Japanese Patent Application Laid-Open (JP-A) No. 2000-263910] for making the forgery more difficult. The method provides display media such as cards with, for example, a hologram adapted to individual information such as ID number, production lot, and the like, thereby making the hologram more effective for preventing alteration and thus more reliably ensuring the security of the cards. The on-demand holograms are usually printed by using a hologram transfer foil ribbon (JP-A No. 2000-211257).

However, the on-demand holograms, which employ a hologram transfer foil ribbon, have the following problems: it is possible for an outsider to duplicate a similar hologram by using a hologram not printed on a display medium but remained on the transfer foil ribbon (thus it is necessary to put the transfer foil ribbon after use under strict control for prevention of forgery); and as the transfer foil ribbon is a relief hologram, it is possible to forge the hologram by examining the surface relief structure thereof.

On the other hand, the holograms most effective in preventing forgery and alteration are volume holograms represented by Lippmann hologram and the like. These volume holograms, which form a refractive index modulation grating in an optical material such as photopolymer instead of forming a surface relief pattern, are much more resistant to forgery.

As volume holograms, there are two types, i.e. a reflection type hologram, in which signal beam and reference beam are irradiated and recorded in opposing directions relative to a hologram recording medium, and a transmission type hologram in which signal beam and reference beam are irradiated and recorded in the same direction relative to a hologram recording medium. In both of the two, the signal beam and the reference beam interfere with each other in the hologram recording medium, and the resulting interference fringes induce refractive index changes or absorptivity changes in the hologram recording medium, thereby recording the hologram.

However, in a recording method of a conventional volume hologram, the signal beam formed as a pattern, according to the images or characters to be recorded, is made to be incident onto the hologram recording medium, and the reference beam is irradiated so as to cover the irradiation area of the signal beam. According to this method, reference beam is irradiated alone onto areas where the pattern of the signal beam is absent, thereby forming an undesired diffraction grating from multiple interference or the like due to the layer structure constituting the hologram recording medium. This undesired diffraction grating creates undesired diffracted light which deteriorates the finish of the reproduced image, causing problems.

SUMMARY OF THE INVENTION

The present invention has been made in view of the above circumstances and provides a hologram recording apparatus and a hologram recording method by which a volume hologram being less susceptible to forgery or alteration and having a superior finish can be recorded on demand.

In a first aspect of the invention, a hologram recording apparatus includes: a light source for irradiating coherent light; light separator for separating the coherent light into light for reference beam and light for signal beam; optical path changer for changing an optical path of each light separated by the light separator so that the reference beam and the signal beam may be irradiated simultaneously onto an optical recording medium; a spatial light modulator disposed in the optical path of the light for the signal beam for modulating the light for the signal beam in accordance with a supplied recording signal to create signal beam for recording a hologram; and diffused light irradiator for irradiating diffused light simultaneously with the reference beam at least onto an area of the optical recording medium where the reference beam is irradiated.

In this hologram recording apparatus, coherent light irradiated from a light source is separated into light for a reference beam and light for a signal beam by a light separator, and an optical path thereof is changed by an optical path changer, whereby the reference beam and the signal beam are irradiated simultaneously onto an optical recording medium. A spatial light modulator is disposed in the optical path of the light of the signal beam. The spatial light modulator modulates the light of the signal beam in accordance with a supplied recording signal so as to create the signal beam for recording a hologram. Further, a diffused light irradiator irradiates diffused light simultaneously with the reference beam at least onto areas of the optical recording medium where the reference beam is irradiated.

Thus, the signal beam and the reference beam are irradiated simultaneously onto the optical recording medium, whereby a volume hologram is recorded in the optical recording medium. Also, the reference beam and the diffused light are irradiated simultaneously onto the optical recording medium, whereby a random diffraction grating having grating vectors of random orientation is recorded in the optical recording medium.

The reference beam that has been irradiated onto the areas where the signal beam is not irradiated undergoes multiple interference, whereby an undesired diffraction grating is recorded in the optical recording medium; however, this undesired diffraction grating is buried in the random diffraction grating. Since the diffracted light from the random diffraction grating is not visually recognized as a reproduced image having an intensity distribution, recording the random diffraction grating by irradiation of the diffused light suppresses deterioration of the reproduced image of the signal beam caused by the undesired diffraction grating.

The diffused light irradiator may include a diffusing body that diffuses at least one of the reference beam and the signal beam that have passed through the optical recording medium, and a reflecting body that reflects the diffused light diffused by the diffusing body towards the optical recording medium. When the hologram recording apparatus further includes a reflecting stage on which the optical recording medium is mounted, the diffused light irradiator may include a diffusing body that diffuses the reference beam that has passed through the optical recording medium and been reflected by the reflecting stage, and a reflecting body that reflects the diffused light diffused by the diffusing body towards the optical recording medium.

The diffused light irradiator may include a diffused light separator for separating light for the diffused light from the light for the reference beam, diffused light optical path changer for changing an optical path of the light separated by the diffused light separator so that the reference beam and the diffused light may be irradiated simultaneously onto the optical recording medium, and a diffusing body that diffuses the light for the diffused light.

The diffusing body may be, for example, a diffusing plate having at least one roughened surface.

The reference beam and the signal beam are preferably circular polarized beams having the same rotation direction as each other. A circular polarized beam (reference beam) reflected by an ideal reflecting surface becomes a circular polarized beam having an opposite rotation direction, so that the incident light of the reference beam and the reflected light of the reference beam will be circular polarized beams having opposite rotation directions to each other. When circular polarized beams having opposite rotation directions to each other intersect with each other, no intensity distribution is formed, so that a diffraction grating formed by multiple interference of the reference beam will not be recorded.

On the other hand, the incident light of the reference beam and the incident light of the signal beam are circular polarized beams having the same rotation direction as each other, so that they form an intensity distribution when they intersect with each other, thereby recording a desired hologram.

In a second aspect of the invention, a hologram recording method that irradiates signal beam and reference beam simultaneously onto an optical recording medium to record information of the signal beam as a hologram comprises recording a random diffraction grating having grating vectors of random orientation together with recording of the hologram.

For example, by irradiating diffused light simultaneously with the reference beam, at least onto areas of the optical recording medium where the reference beam is irradiated, a random diffraction grating having grating vectors of random orientation can be recorded together with recording the hologram.

As described above, the invention produces an effect such that a volume hologram being less susceptible to forgery or alteration, and having a superior finish can be recorded on demand with a simple apparatus configuration.

DETAILED DESCRIPTION OF THE INVENTION

Hereafter, one example of an embodiment of the invention will be described in detail with reference to the attached drawings.

First Embodiment

Figure 1:
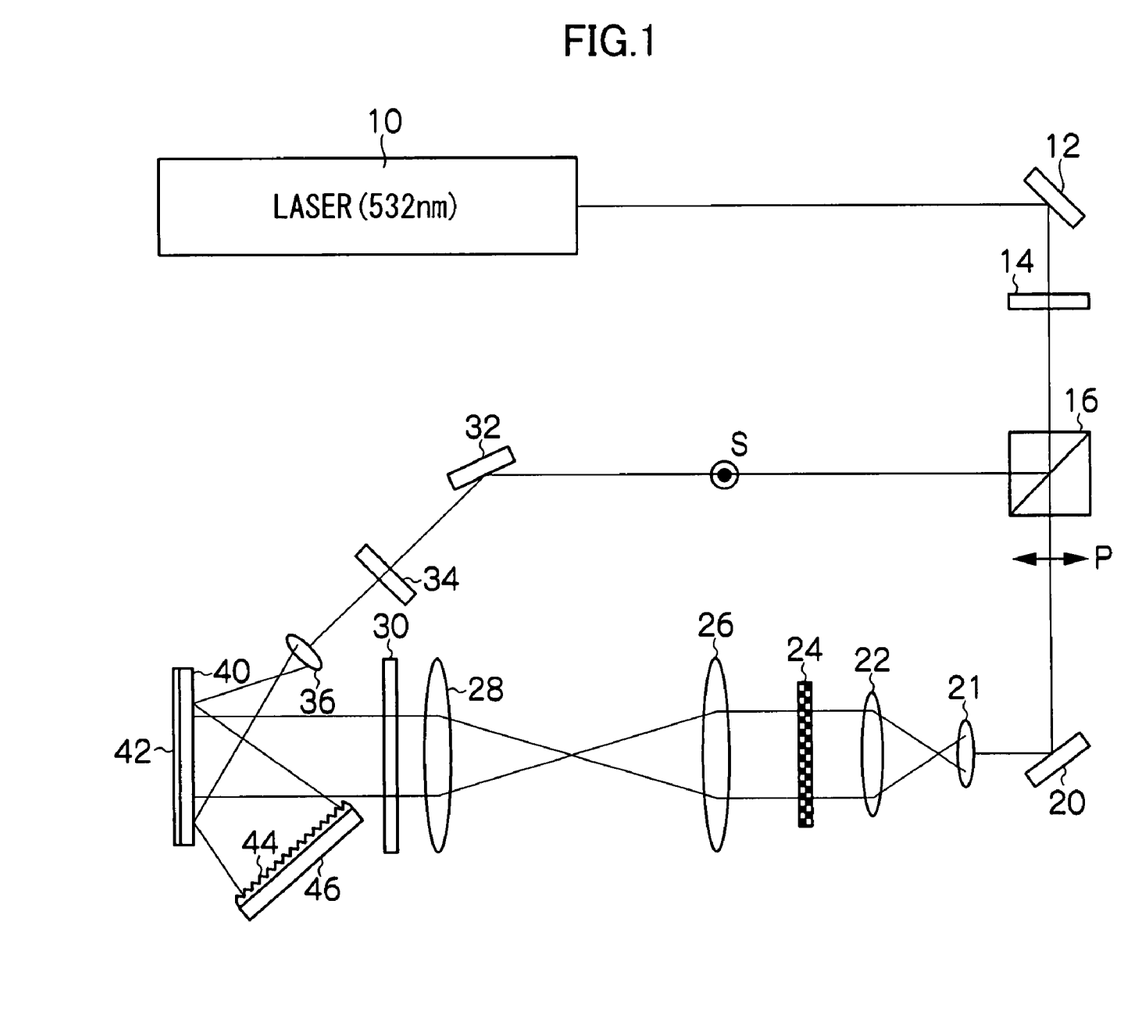
FIG. 1 is a schematic view illustrating a hologram recording apparatus according to a first embodiment of the invention.

Referring to FIG. 1, a hologram recording apparatus according to the present embodiment includes a laser light source 10. From this laser light source 10, laser light of wavelength 532 nm being a coherent beam is emitted and irradiated.

On the laser light irradiation side of laser light source 10, there are a reflecting mirror 12 that reflects the laser light to change the optical path thereof, a half waveplate 14 that rotates the polarization plane of the linear polarized light reflected by reflecting mirror 12, and a polarizing beam splitter 16 that separates the laser light into two beams, i.e. light for the reference beam and light for the signal beam, by transmitting the P polarized light and reflecting the S polarized light, these components being arranged in this order. The half waveplate 14 is used for adjusting the intensity ratio of the signal beam and the reference beam.

On the light transmission side of the polarizing beam splitter 16, there is: a reflecting mirror 20, that reflects the laser light for the signal beam at a reflection angle of 45° to change the optical path thereof towards the direction of a hologram recording medium 40; a lens configuration constituted of lenses 21, 22, 26, 28, and a quarter waveplate 30 that converts the linear polarized light into circular polarized light, these components being arranged in this order.

Between lens 22 and lens 26, there is disposed a spatial light modulator 24 of transmission type that is constituted of a liquid crystal display element or the like, and modulates the laser light for the signal beam in accordance with a supplied recording signal to create a signal beam for recording a hologram. On the light transmission side of the quarter waveplate 30, there is disposed a reflecting mirror 42 serving as a stage for mounting hologram recording medium 40.

Here, as will be described later, hologram recording medium 40 may include a reflecting layer and, when hologram recording medium 40 itself includes a reflecting layer, reflecting mirror 42 can be omitted.

The P polarized light that has passed through the polarizing beam splitter 16 is reflected by reflecting mirror 20 to be incident onto lenses 21 and 22. The incident laser light is collimated into a large-diameter beam by lenses 21, 22 to be irradiated into the spatial light modulator 24. The P polarized light that has been modulated by spatial light modulator 24 becomes S polarized light to be emitted. The S polarized light emitted from spatial light modulator 24 passes through lenses 26, 28 and is converted into circular polarized light having a right rotation direction by quarter waveplate 30. Then, this circular polarized light having a right rotation direction is irradiated onto hologram recording medium 40 as the signal beam.

Here, spatial light modulator 24 functions as what is called a programmable mask. Namely, when laser light is irradiated onto spatial light modulator 24 on which an image is displayed, the irradiated laser light undergoes intensity modulation in accordance with the value of each pixel of the digital data image, and the modulated light is irradiated onto hologram recording medium 40. Namely, a hologram can be recorded on demand. Lenses 26, 28 are used for imaging the image displayed on spatial light modulator 24 at a position of hologram recording medium 40.

On the light reflection side of polarizing beam splitter 16, there is: a reflecting mirror 32, that reflects the laser light for reference beam to change the optical path thereof towards the direction of hologram recording medium 40; a quarter waveplate 34 that converts the linear polarized light into circular polarized light, and an object lens 36 that converges and diverges the laser light for the reference beam to generate the reference beam with a spherical reference wave, these components being arranged in this order.

The S polarized light reflected by polarizing beam splitter 16 is reflected by reflecting mirror 32 and is converted into a circular polarized beam having a right rotation direction by quarter waveplate 34. This circular polarized beam having a right rotation direction is converged and diverged by object lens 36, whereby a circular polarized beam being a spherical reference wave is irradiated onto hologram recording medium 40 as the reference beam.

At this time, the reference beam is irradiated so that the irradiation spot of the reference beam becomes larger than the irradiation spot of the signal beam, and the circular polarized beams rotating in the same direction are simultaneously irradiated onto hologram recording medium 40 respectively as the signal beam and the reference beam.

On the reference beam reflecting side of the reflecting mirror 42, there are disposed a diffusing plate 44, that diffuses the incident light and a reflecting mirror 46 that reflects the diffused light, these components being arranged in this order. As the diffusing plate 44, one can use a diffusing plate of transmission type having at least one roughened surface such as ground glass. For example, "frost type diffusing plate", number between #240 and #1500, manufactured by Sigma Koki Co., Ltd. can be used. Reflecting mirror 46 may be either a plane mirror or a curved surface mirror.

The circular polarized beam reflected by the reflecting mirror 42 is diffused by the diffusing plate 44. The diffused light diffused by the diffusing plate 44 is reflected towards the hologram recording medium 40 by the reflecting mirror 46, whereby the reflected diffused light is irradiated onto hologram recording medium 40. At this time, the diffused light is irradiated onto an area that is wider than the irradiation spot of the reference beam.

In the above-described hologram recording apparatus, the signal beam and the reference beam are irradiated onto the hologram recording medium 40 from the same side, whereby a refractive index modulation corresponding to the recording beams is formed in the inside of the hologram recording medium 40. Thus, by irradiating the signal beam and the reference beam onto the hologram recording medium 40 from the same side, a volume hologram of transmission type is formed in the hologram recording medium 40.

Further, the reference beam and the diffused light are irradiated onto the hologram recording medium 40 from the same side, whereby a random diffraction grating having grating vectors of random orientation is recorded within the hologram recording medium 40. The reference beam irradiated onto areas where the signal beam is not irradiated undergoes multiple interference, whereby an undesired diffraction grating is recorded in hologram recording medium 40; however, this undesired diffraction grating is buried in the random diffraction grating.

The diffracted light from a random diffraction grating has a random intensity distribution with repeated spikey unevenness, so that the diffracted light is visually recognized as a generally uniform intensity distribution. Namely, the diffracted light from the random diffraction grating is not visually recognized as a reproduced image having a specific intensity distribution. Therefore, the irradiation of the diffused light suppresses deterioration of the reproduced image of the signal beam caused by the undesired diffraction grating.

-Recording/Reproduction Experiment-

Figure 2A:
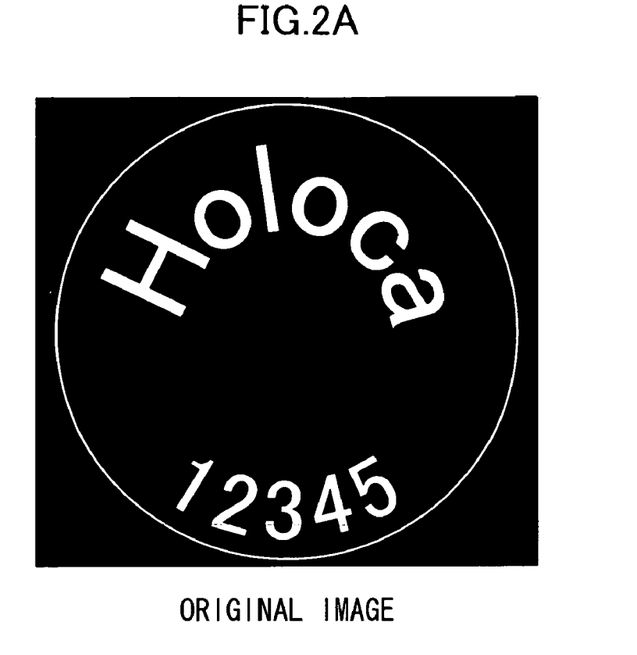
FIG. 2A is an original image to be recorded as a hologram.

A hologram recording medium is produced in which a photopolymer "NPX001(R)" manufactured by Nippon Paint Co., Ltd. is formed into a sheet having a film thickness of 15 μm. By using a hologram recording apparatus shown in FIG. 1 with the use of a binary image shown in FIG. 2A as a programmable mask, a hologram is recorded while irradiating diffused light onto the obtained recording medium. The recording condition is as follows.

Object lens for reference beam: NA=0.4

Lens(es) disposed between the spatial light modulator and the quarter waveplate: focal length f=100 mm Signal beam and reference beam: wavelength 532 nm, light intensity 10 mW/cm$^2$ Exposure energy: 60 mJ/cm$^2$ Diffusing plate: "frost type diffusing plate", number #240, manufactured by Sigma Koki Co., Ltd.

After the exposure, the hologram recording medium is heated at 100° C. for 10 minutes, and subsequently ultraviolet rays of wavelength 365 nm are irradiated so that the exposure amount is 3.51 J/cm$^2$, and a fixing process is carried out.

Figure 2B:
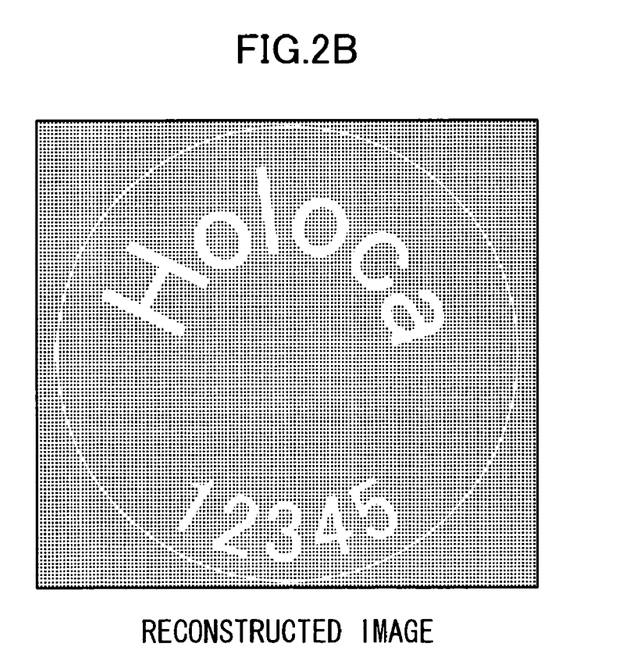
FIG. 2B is a reproduced image from the hologram that records the image of FIG. 2A.

When the recording medium having a hologram recorded therein is mounted on a reflecting mirror and white light is irradiated therein, a reproduced image such as shown in FIG. 2B is obtained. It will be understood that the binary image shown in FIG. 2A has been reproduced. In the case where an undesired diffraction grating caused by multiple interference of reference beam is recorded, a fringe-like noise appears in the reproduced image; however, by irradiating diffused light, the fringe-like noise disappears.

As described above, since the hologram recorded on demand is a volume hologram in the present embodiment, the recorded hologram is less susceptible to forgery or alteration.

Further in addition to a signal beam and a reference beam, diffused light is irradiated over the irradiation area of the reference beam, so that the undesired diffraction grating recorded by multiple interference of the reference beam is buried in a random diffraction grating, thereby suppressing deterioration of the reproduced image of the signal beam, which deterioration is caused by the undesired diffraction grating. This achieves recording of a volume hologram having a superior finish.

Second Embodiment

Figure 3:
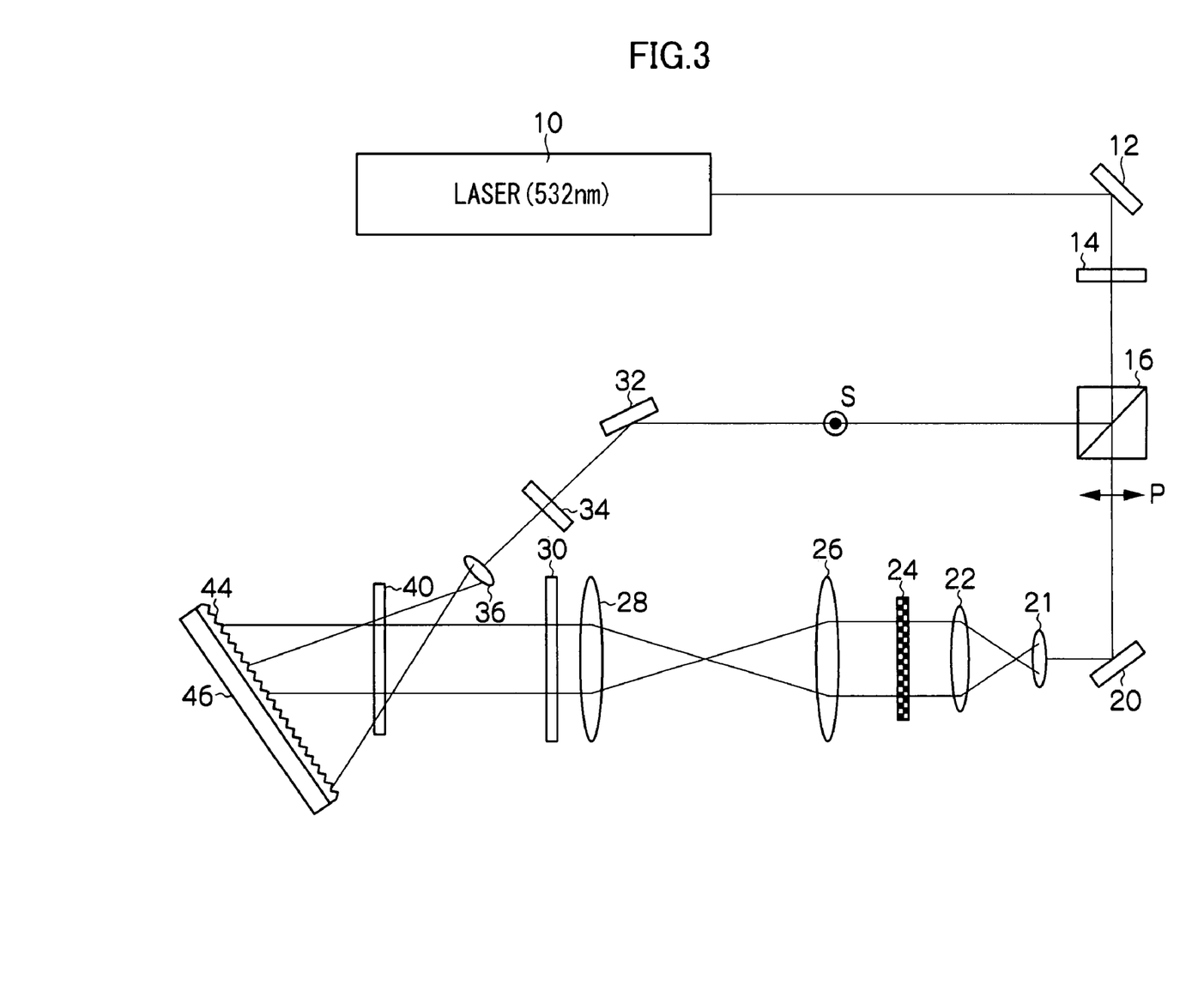
FIG. 3 is a schematic view illustrating a hologram recording apparatus according to a second embodiment of the invention.

Referring to FIG. 3, a hologram recording apparatus according to the present embodiment is not provided with the reflecting mirror 42 for mounting the hologram recording medium 40, and the hologram recording medium 40 is supported by a support (not illustrated). Further, the diffusing plate 44 and the reflecting mirror 46 are disposed on the reference beam transmission side of the hologram recording medium 40.

Except for the above, the hologram recording apparatus according to the present embodiment has the same configuration as the hologram recording apparatus according to the first embodiment shown in FIG. 1, so that the description of the same configuration will be omitted and the same constituent elements will be denoted with the same reference numerals.

In this hologram recording apparatus, the circular polarized light that has passed through hologram recording medium 40 is diffused by diffusing plate 44. The diffused light diffused by diffusing plate 44 is reflected towards hologram recording medium 40 by reflecting mirror 46, and the reflected diffused light is irradiated onto hologram recording medium 40. At this time, the diffused light is irradiated onto an area that is wider than the irradiation spot of the reference beam.

Though the reference beam and the diffused light are irradiated onto hologram recording medium 40 from different sides, a random diffraction grating having grating vectors of random orientation is recorded within the hologram recording medium 40 in the same manner as in the first embodiment. The undesired diffraction grating recorded by multiple interference of the reference beam is buried in the random diffraction grating, thereby suppressing deterioration of the reproduced image of the signal beam caused by the undesired diffraction grating. This achieves recording of a volume hologram having superior finish in the same manner as in the first embodiment.

Third Embodiment

Figure 4:
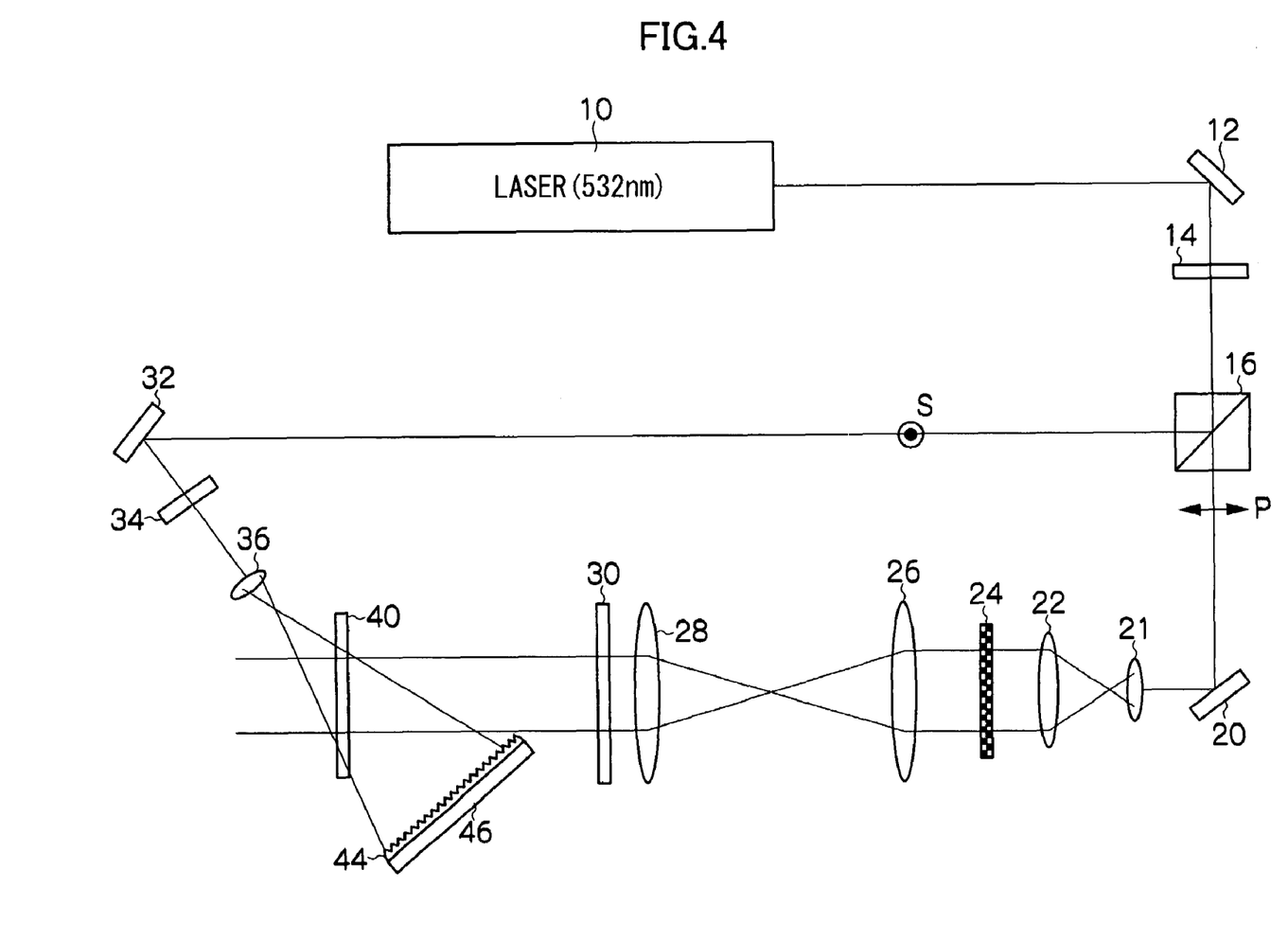
FIG. 4 is a schematic view illustrating a hologram recording apparatus according to a third embodiment of the invention.

Referring to FIG. 4, a hologram recording apparatus according to the present embodiment is not provided with the reflecting mirror 42 for mounting the hologram recording medium 40, and the hologram recording medium 40 is supported by a support (not illustrated). The reflecting mirror 32, quarter waveplate 34, and the object lens 36 are each disposed so that the signal beam and the reference beam will respectively be irradiated onto the hologram recording medium 40 from different sides. Further, the diffusing plate 44 and the reflecting mirror 46 are disposed on the reference beam transmission side of the hologram recording medium 40.

Except for the above, the hologram recording apparatus according to the present embodiment has the same configuration as the hologram recording apparatus according to the first embodiment shown in FIG. 1, so that the description of the same configuration will be omitted and the same constituent elements will be denoted with the same reference numerals.

In this hologram recording apparatus, the signal beam and the reference beam are irradiated onto the hologram recording medium 40 from different sides, whereby a volume hologram of reflection type is recorded in the hologram recording medium 40.

The reference beam that has been transmitted through the hologram recording medium 40 is diffused by diffusing plate 44. The diffused light diffused by the diffusing plate 44 is reflected towards the hologram recording medium 40 by the reflecting mirror 46, and the reflected diffused light is irradiated onto the hologram recording medium 40. At this time, the diffused light is irradiated onto an area that is wider than the irradiation spot of the reference beam.

The reference beam and the diffused light are irradiated onto a hologram recording medium 40 from different sides, whereby a random diffraction grating having grating vectors of random orientation is recorded within the hologram recording medium 40. This suppresses deterioration of the reproduced image of the signal beam caused by the undesired diffraction grating, thereby achieving recording of a volume hologram being excellent in ornamentation in the same manner as in the first embodiment.

Fourth Embodiment

Figure 5:
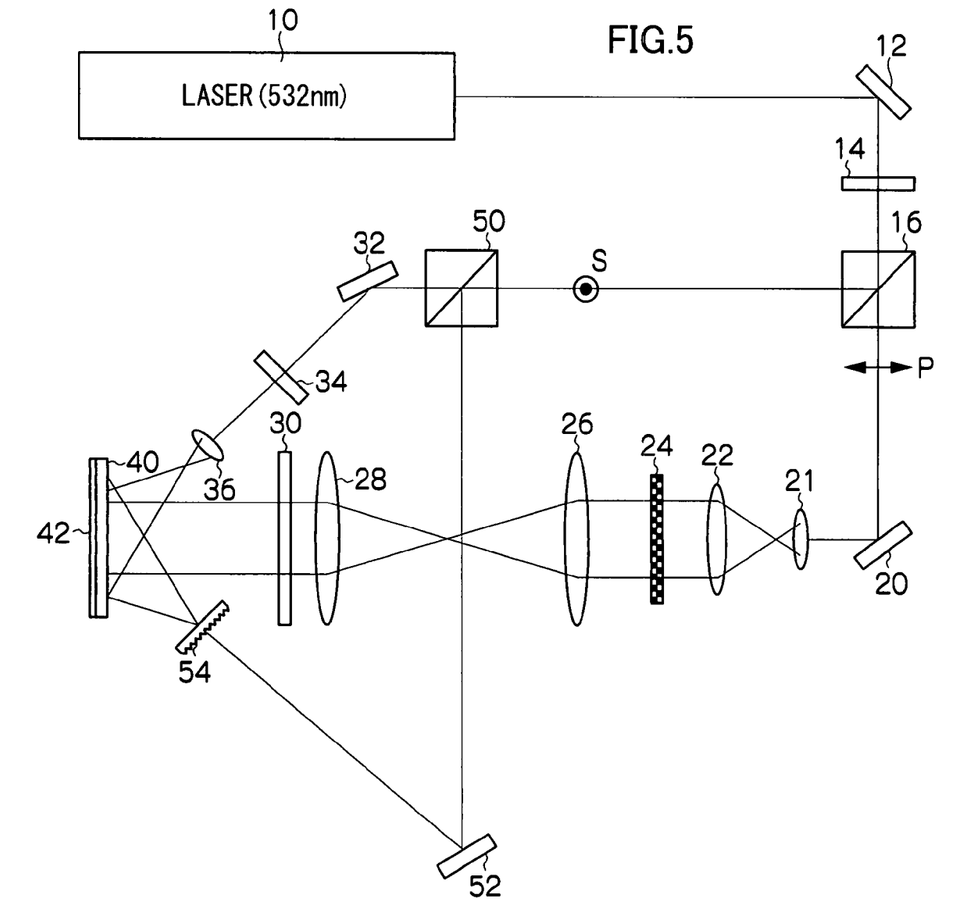
FIG. 5 is a schematic view illustrating a hologram recording apparatus according to a fourth embodiment of the invention.

Referring to FIG. 5, in the hologram recording apparatus according to the present embodiment, instead of obtaining diffused light from the circular polarized light reflected by the reflecting mirror 42, the S polarized light reflected by the polarizing beam splitter 16 is separated into two light waves, and diffused light is created from one of the separated beams. Except for the above, the hologram recording apparatus according to the present embodiment has the same configuration as the hologram recording apparatus according to the first embodiment shown in FIG. 1, so that the description of the same configuration will be omitted and the same constituent elements will be denoted with the same reference numerals.

On the light reflection side of polarizing beam splitter 16, there is disposed a beam splitter 50 that separates the laser light into two beams, i.e. light for the reference beam and light for the diffused light. On the light transmission side of beam splitter 50, there are disposed: a reflecting mirror 32, that reflects the laser light for reference beam to change the optical path thereof towards the direction of hologram recording medium 40; a quarter waveplate 34, that converts the linear polarized light into a circular polarized beam; and an object lens 36, that converges and diverges the laser light for the reference beam to generate a reference beam made of a spherical reference wave. The above components being arranged in the above order.

The S polarized light reflected by the polarized light beam splitter 16 is separated into two light waves by the beam splitter 50. The S polarized light that has passed through the beam splitter 50 is reflected by the reflecting mirror 32 and is converted into a circular polarized beam having a right rotation direction by the quarter waveplate 34. This circular polarized beam having a right rotation direction is converged and diverged by the object lens 36, whereby the circular polarized beam being a spherical reference wave is irradiated onto hologram recording medium 40 as the reference beam.

On the other hand, on the light reflection side of the beam splitter 50, there are disposed a reflecting mirror 52 that reflects the laser light for diffused light to change the optical path thereof towards the direction of hologram recording medium 40, and a diffusing plate 54 that diffuses the incident light, these components being disposed in this order. The S polarized light reflected by the beam splitter 50 is reflected by the reflecting mirror 52, and is diffused by the diffusing plate 54. The S polarized light diffused by the diffusing plate 54 is irradiated onto the hologram recording medium 40 from the same side as the reference beam. At this time, the diffused light is irradiated onto an area wider than the irradiation spot of the reference beam.

In the above-described hologram recording apparatus, the signal beam and the reference beam are irradiated onto the hologram recording medium 40 from the same side, whereby a volume hologram of transmission type is recorded in hologram recording medium 40. Further, the reference beam and the diffused light are irradiated onto a hologram recording medium 40 from the same side, whereby a random diffraction grating having grating vectors of random orientation is recorded within the hologram recording medium 40. This suppresses deterioration of the reproduced image of the signal beam caused by an undesired diffraction grating, thereby achieving recording of a volume hologram being excellent in ornamentation in the same manner as in the first embodiment.

(Other Modifications and the Like)

Here, the above-described hologram recording medium used in these embodiments is a recording material into which a volume hologram can be written by changes in the refractive index, and is constituted, for example, to have a sheet form. A recording material into which a volume hologram can be written may be, for example, a photopolymer. An example of the photopolymer may be a photopolymer disclosed in Japanese Patent No. 2849021, the disclosure of which is incorporated by reference herein.

As the recording material, also usable are photorefractive materials, photochromic materials, and polarized light-sensitive materials that exhibit a photo-induced change in refractive index or a photo-induced dichroism and retain these properties at the room temperature. These photorefractive materials, photochromic materials, and polarized light-sensitive materials allow removal of a prerecorded hologram and recording of a new hologram, i.e., rewriting of a hologram by photoirradiation.

Among them, preferable are polymers having a photoisomerizable group on a side chain thereof, for example, at least one type of polymer selected from polyesters having, on a side chain thereof, a photoisomerizable group such as an azobenzene skeleton.

Azobenzene repeats trans-cis-trans isomerization cycles by photoirradiation. Before photoirradiation, there exist many azobenzene molecules in the trans form in the optical recording layer. These molecules are randomly oriented and thus macroscopically isotropic. When irradiated with a linearly polarized light, azobenzene molecules having an absorption axis parallel to the polarization direction of the light are selectively excited and subjected to trans-cis isomerization. The azobenzene molecules in a relaxed state in which the molecules in the trans form each have an absorption axis orthogonal to the polarization direction of the light do not absorb the light any more and remain in the state. As a result, anisotropies in absorption coefficient and refractive index, i.e., dichroism and birefringence, are induced macroscopically. Such a polymer having a photoisomerizable group also experiences a change in orientation of the polymer itself, due to the photoisomerization, thereby inducing a significantly large change in birefringence of the polymer. The birefringence thus induced remains stable at a temperature no higher than the glass transition temperature of the polymer, and thus is favorable for hologram recording.

For example, the polyester having cyanoazobenzene on a side chain thereof represented by the Formula 1 below (JP-A No. 10-340479) is favorable as the material for recording a hologram by the mechanism described above. The polyester records the polarization direction of a signal light as a hologram based on the photo-induced anisotropy triggered by photoisomerization of the cyanoazobenzenes on the side chains, thus allows recording of the hologram at room temperature, and maintains the recorded hologram semipermanently unless an eraser light is irradiated thereon.

[Formula 1]

The hologram recording medium preferably has a thickness within a range of 3 μm to 200 μm in view of preventing bulkiness, more preferably within a range of 10 μm to 100 μm in order to improve the diffraction efficiency. For example, when a polyester having cyanobenzene in the side chain shown by the above chemical formula is to be used as the recording material, hologram recording medium 40 is formed as follows. After a plate-shaped molding is produced by injection molding, this plate-shaped molding is sandwiched between a pair of mould release resin films, followed by hot pressing under a vacuum, to form the hologram recording medium 40 having a sheet form.

The hologram recording medium 40 is used by releasing it from the resin films and cutting it into small pieces (chips) of several mm square (for example, 8 mm square). The heating temperature is preferably a temperature higher than or equal to the glass transition temperature (Tg) of the recording material, and the pressing pressure is preferably 0.01 to 0.1 t/cm². The mould release resin films may be, for example, a polyethylene terephthalate (PET) film on which silicone resin is applied as a releasing agent.

Further, the hologram recording medium can have a multiple layer construction. For example, the hologram recording medium may be provided with a substrate, a reflecting layer, and/or a protecting layer in addition to the recording layer.

The reflection layer is made of a thin film of a light-reflecting material having a reflectance of 70% or more with respect to the laser beam used for recording and reproduction. Examples of the light-reflecting materials include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steels. Among them, Au, Ag, Al, and the alloys thereof are preferable, and Al (aluminum) is particularly preferable. The light-reflecting materials described above may be used alone or in combination of two or more.

The reflecting layer can be formed, for example, by subjecting the above-described light reflecting material to vapor deposition, sputtering, or ion plating. The reflecting layer preferably has a thickness within the range of 1 nm to 100 μm in view of preventing bulkiness. Within this range, the thinner the reflecting layer the better.

The protecting layer can be formed with a flexible resin material that is transparent to the laser light used for recording/reproduction. The protecting layer preferably has a thickness within a range of 1 μm to 200 μm in view of preventing bulkiness. Within this range, the thinner the protecting layer the better. The transmittance of the protecting layer to laser light used for recording/reproduction is preferably 50% or higher, more preferably 80% or higher, in view of light utilization efficiency.

In the above-described embodiments, the signal beam and the reference beam are circular polarized beams rotating in the same direction; however, they may be any polarized light as long as they form an intensity distribution (interference fringes) by intersecting with each other in the hologram recording medium. For example, the signal beam and the reference beam may both be S polarized light or both be P polarized light.

Further, when a polarized light sensitive material such as a material having an azobenzene skeleton is to be used as the hologram recording medium, the signal beam and the reference beam may be any polarized light as long as they form a polarized light distribution by intersecting with each other in the hologram recording medium. For example, the signal beam may be P polarized light, and the reference beam may be S polarized light.

However, when a material that can record only an intensity distribution (interference fringes) such as a photopolymer or a photorefractive material is to be used as the hologram recording medium, the signal beam and the reference beam are preferably circular polarized beams rotating in the same direction. Since the reflected light of the light that is incident onto a medium having a larger refractive index from a medium having a smaller refractive index undergoes a phase shift of 180°, a circular polarized beam (reference beam) reflected by an ideal reflecting surface becomes a circular polarized beam rotating in the opposite direction. Since circular polarized beams rotating in opposite directions do not form an intensity distribution, the formation of a diffraction grating by multiple interference of the reference beam is suppressed.

Figure 6:
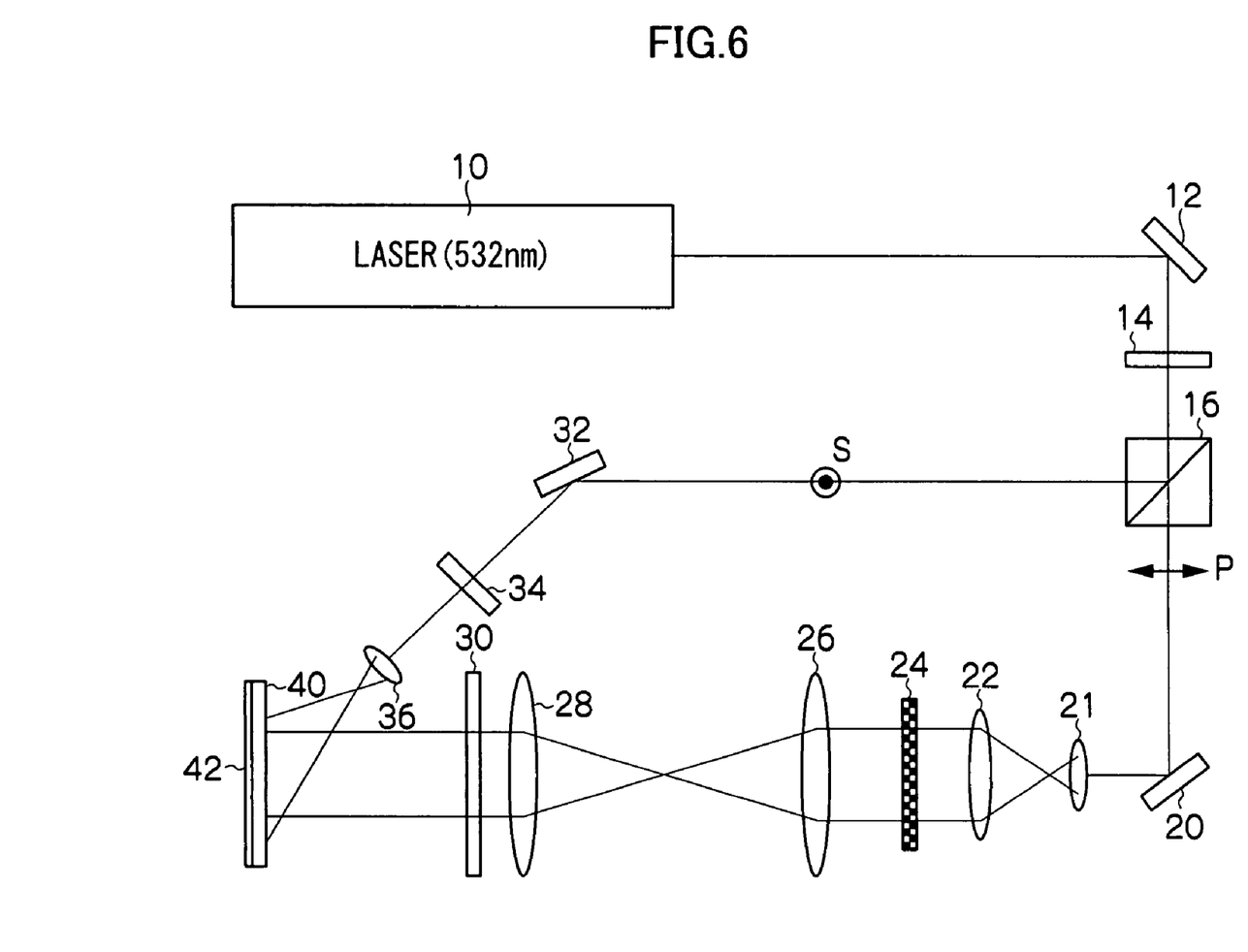
FIG. 6 is a schematic view illustrating another configuration example of a hologram recording apparatus.

Therefore, referring to FIG. 6, when an ideal reflecting surface is formed with the hologram recording medium 40 and the reflecting mirror 42, the formation of a diffraction grating by multiple interference of the reference beam is suppressed by the signal beam and the reference beam being circular polarized beams rotating in the same direction. Therefore, diffusing plate 44 and reflecting mirror 46 serving as means for irradiating diffused light can be omitted.

Here, except for the omission of diffusing plate 44 and reflecting mirror 46, the hologram recording apparatus according to the present embodiment has the same configuration as the hologram recording apparatus according to the first embodiment shown in FIG. 1, so that the description of the same configuration will be omitted and the same constituent elements will be denoted with the same reference numerals.

In the above-described embodiments, the reference beam is a spherical reference wave; however, the shape of the wave front of the reference beam is not limited to this alone, so that a plane wave, for example, may be employed.

What is claimed is:

1. A hologram recording apparatus comprising:
a light source, for irradiating coherent light;
light separator, for separating the coherent light into light for a reference beam and light for a signal beam;
optical path changer, for changing an optical path of each light separated by the light separator so that the reference beam and the signal beam may be irradiated simultaneously onto an optical recording medium;
a spatial light modulator, disposed in the optical path of the light for the signal beam for modulating the light for the signal beam in accordance with a supplied recording signal to create signal beam for recording a hologram; and
a diffused light irradiator for irradiating diffused light simultaneously with the reference beam onto at least areas of the optical recording medium where the reference beam is irradiated,
wherein the diffused light irradiator includes:
a diffusing body that diffuses at least one of the reference beam and the signal beam that have passed through the optical recording medium, and
a reflecting body that reflects the diffused light diffused by the diffusing body towards the optical recording medium.

2. The hologram recording apparatus of claim 1, wherein the diffused light irradiator includes: another light separator, for separating light for the diffused light from the light for the reference beam; a diffused light optical path changer, for changing an optical path of the light separated by the diffused light separator so that the reference beam and the diffused light may be irradiated simultaneously onto the optical recording medium; and, a diffusing body that diffuses the light for the diffused light.

3. The hologram recording apparatus of claim 1, wherein the diffusing body is a diffusing plate having at least one roughened surface.

4. The hologram recording apparatus of claim 1, wherein the reference beam and the signal beam are circular polarized beams having the same rotation direction as each other.

5. The hologram recording apparatus of claim 1, wherein the reference beam and the diffused light are irradiated onto the optical recording medium respectively from different sides of the optical recording medium.

6. The hologram recording apparatus of claim 1, wherein the reference beam and the signal beam are irradiated onto the optical recording medium from the same side of the optical recording medium.

7. The hologram recording apparatus of claim 1, wherein the reference beam and the signal beam are irradiated onto the optical recording medium from different sides of the optical recording medium.

8. A hologram recording method that irradiates a signal beam and a reference beam simultaneously onto an optical recording medium to record information of the signal beam as a hologram, comprising recording a random diffraction grating having grating vectors of random orientation, together with recording the hologram,
wherein the reference beam is reflected by a reflector on which the optical recording medium is mounted, thereby achieving recording of the random diffraction grating.

9. The hologram recording method of claim 8, wherein the reference beam and the signal beam are circular polarized beams having the same rotation direction as each other.

10. The hologram recording method of claim 8, wherein diffused light is irradiated, simultaneously with the reference beam, onto at least areas of the optical recording medium where the reference beam is irradiated.

11. The hologram recording method of claim 10, wherein the reference beam that has passed through the optical recording medium is diffused, and the diffused light is reflected to be irradiated onto the areas of the optical recording medium as the diffused light.

12. The hologram recording method of claim 10, wherein light for the diffused light is separated from the reference beam, and the separated light is diffused and then irradiated onto the areas of the optical recording medium as the diffused light.

* * * * *